3 Sheets—Sheet 1.

A. R. REESE.
HARVESTER.

No. 64,797. Patented May 14, 1867.

Witnesses:
Inventor:

3 Sheets—Sheet 2.

A. R. REESE.
HARVESTER.

No. 64,797. Patented May 14, 1867.

Witnesses:

Inventor:

3 Sheets—Sheet 3.

A. R. REESE.
HARVESTER.

No. 64,797. Patented May 14, 1867.

Witnesses: Inventor:

United States Patent Office.

ADAM R. REESE, OF PHILLIPSBURG, NEW JERSEY.

Letters Patent No. 64,797, dated May 14, 1867.

---

IMPROVEMENT IN HARVESTERS.

---

*The Schedule referred to in these Letters Patent and making part of the same.*

---

TO ALL WHOM IT MAY CONCERN:

Be it known that I, ADAM R. REESE, of Phillipsburg, in the county of Warren, and State of New Jersey, have invented a new and improved Harvester; and I do hereby declare that the following is a full, clear, and exact description thereof, which will enable others skilled in the art to make and use the same, reference being had to the accompanying drawings, forming part of this specification, in which—

Figure 1:
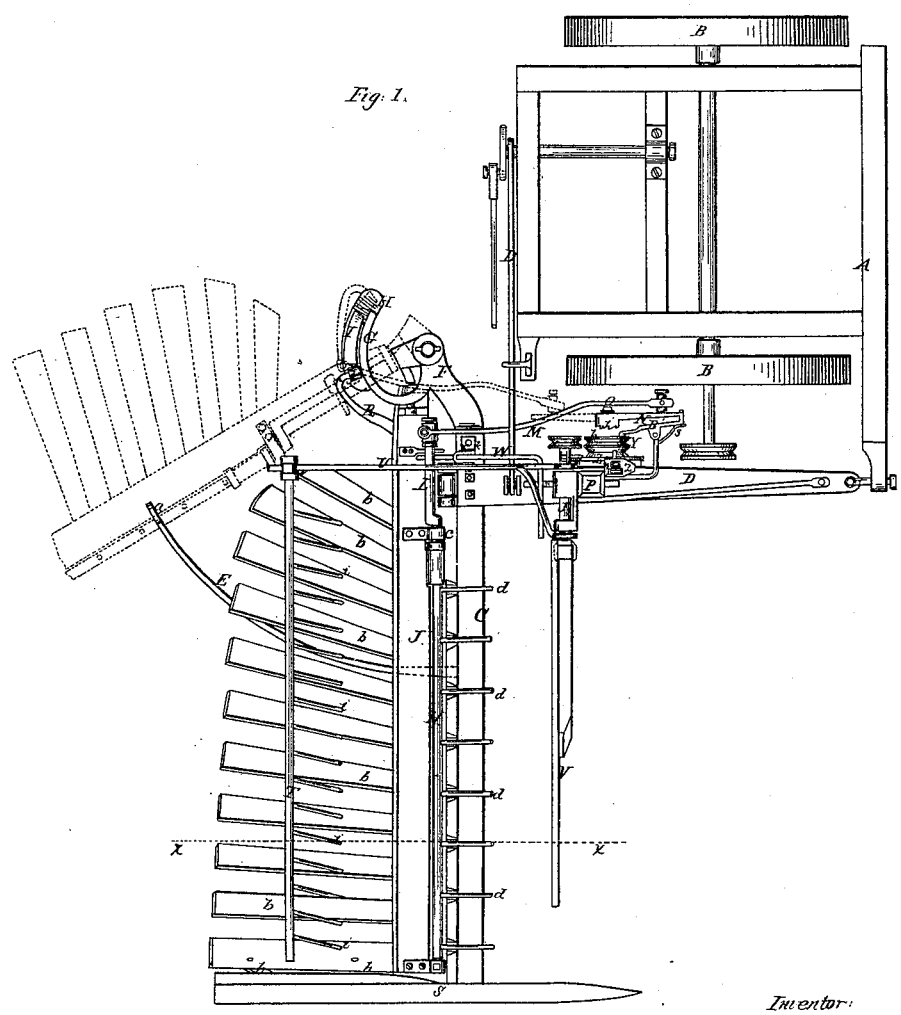

Figure 1, Sheet No. 1, is a plan or top view of my invention.

Figure 2:
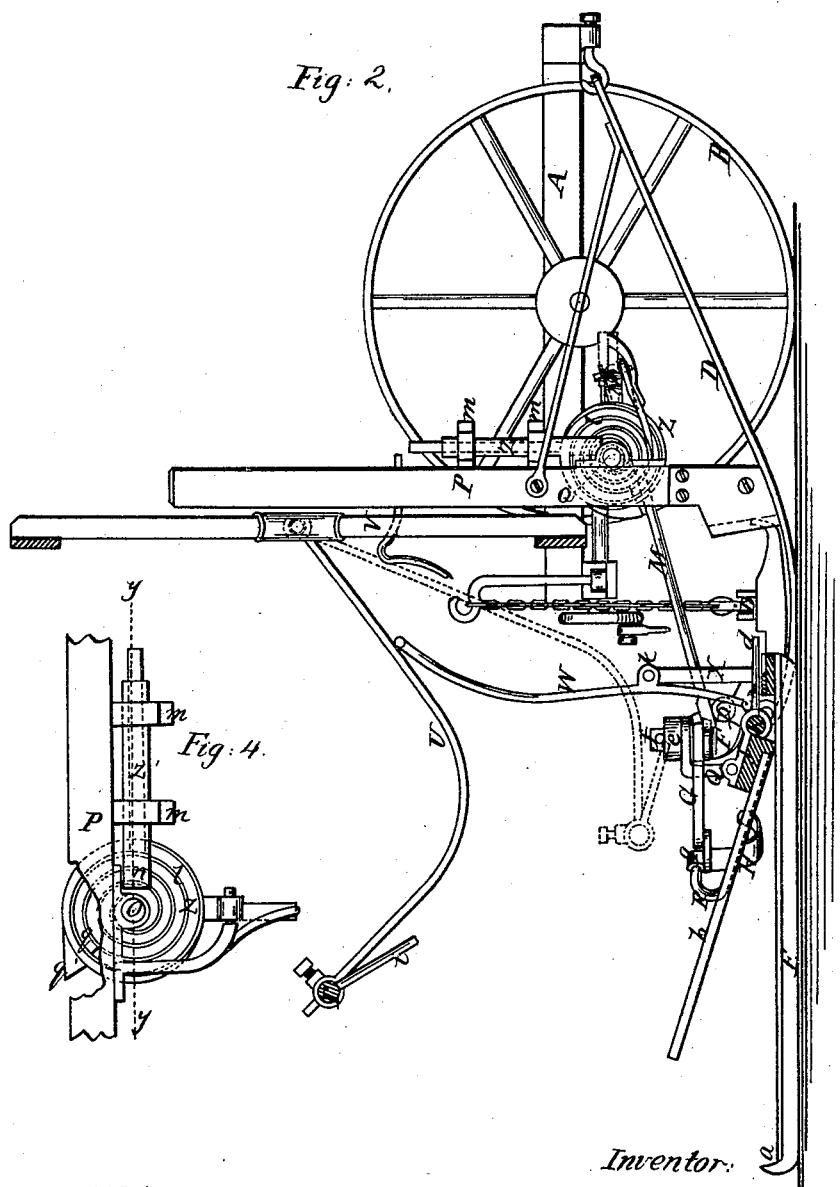

Figure 2, Sheet No. 2, a side sectional view of the same taken in the line $xx$, fig. 1.

Figure 3:
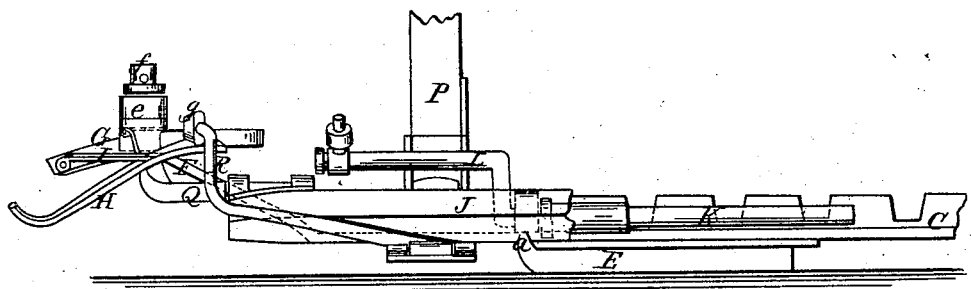

Figure 3, a detached rear view of the mechanism by which the platform is operated.

Figure 4, a detached side view of the mechanism by which the discharging movement of the grain-platform is regulated.

Figure 5:
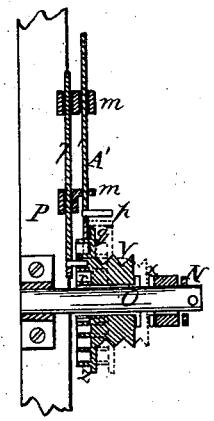

Figure 5, a section of fig. 3 taken in the line $yy$, fig. 4.

Similar letters of reference indicate like parts.

This invention relates to a new and improved means for discharging cut grain from harvesters with a side delivery. The invention consists in a moving and dumping grain-platform provided with fingers, and arranged and operated in such a manner as to gather up the short and lodged grain and throw it upon the platform previous to the backward and discharge movement of the latter. The invention also consists in a means for regulating the discharge movement of the grain-platform, whereby the grain may be dumped or discharged in gavels of uniform size for binding, whether the crop be light or heavy. The invention further consists in a novel arrangement of the means employed for supporting the cut grain while the platform is moving back to discharge its load.

A represents the main frame of the machine, which is supported on two wheels, B B, and C is the finger-bar, connected by bars D D to the main frame, the finger-bar being at the right-hand side of the rear of the machine, and being allowed to rise and fall to accommodate itself to the inequalities of surface over which it may pass in consequence of the ends of the bars D D being connected to the main frame by joints. This, however, forms no part of the invention. E represents a curved bar which projects from the rear side of the finger-bar, and has a hook, $a$, at its rear end; and F is a curved bar which is attached to the inner end of the finger-bar. This bar F has a segment-bar, G, permanently secured to it, and to this segment-bar G a flange, H, is secured, said flange being inclined downward from the inner towards the outer end of bar G, as shown clearly in fig. 3. I is a pivoted flange also attached to bar G directly over flange H. The position of these flanges is shown clearly in fig. 3. J is a bar which has a series of arms, $b$, projecting obliquely from its rear side. At the front edge of the bar J there is placed a shaft, K, which is allowed to turn freely in bearings, $c$, said shaft having a series of fingers, $d$, attached to it at equal distances apart, and extending along its whole length, and also having a crank-arm L secured to its inner end, the outer end of said crank-arm being connected by a pitman, M, with a crank, N, on a shaft, O, which is attached to a post, P, secured to one of the bars D. The inner end of the bar J is fitted on a small shaft, Q, the outer end of which is provided with a collar, $e$, said collar working on a vertical stud, $f$, on the outer end of the bar F. The bar J, with its arms $b$, constitutes the grain-platform in which the cut grain falls, and it has a reciprocating motion imparted to it by means of the pitman M and crank N. To the inner end of the bar J there is attached a curved arm, R, having a friction-roller, $g$, on its end, which works on the flange H. As the grain-platform moves backward it rests upon the curved bar E, and the roller $g$ of the arm R works over the top of the pivoted flange I, and drops from the end thereof down upon the flange H, when the bar J of the grain-platform arrives at the hook $a$ of the curved bar E, and the arms $b$ consequently drop, so that the cut grain will be discharged in a line with the side of the machine. This is effected in consequence of the grain-platform moving in the arc of a circle, the extent of the outward movement being shown in red in fig. 1. As the grain-platform is drawn forward the friction-roller $g$ passes underneath the pivoted flange I and raises it. The pitman M being connected to the crank-arm L of the shaft K, the fingers $d$ are turned up to a vertical position as the grain-platform is moved backward, and these fingers, in being turned up, gather in the short grain and that which is lodged, and throw it back upon the platform and retain it there until the platform is dumped or tilted down, the fingers $d$ being drawn down to a horizontal position, under the action of the pitman, when the grain-platform is drawn forward. To the outer end of the finger-bar a track-clearer, S, is attached, and the outermost arm $b$ of the bar J has the pivoted fingers $h\ h$ attached to it, connected at their lower ends by a bar, the forward end of which is bent upward and outward, and adapted to strike a shoulder on the lower side of the clearer S, and throw up the fingers, which prevents the grain from falling off from the outer end of the platform and lodging between the clearer and grain-platform. On the backward motion of the grain-platform the fingers drop by their own gravity. These fingers prevent the grain from falling off from the outer end of the platform. While the grain-platform is being moved backward in order to discharge its load, the grain is supported by a bar, T, provided with teeth $i$, having an oblique position. This bar T is secured at one end to an arm, U, the upper end of which is forked and fitted loosely on the shaft $j$ of the reel V. W is a lever, the fulcrum, $k$, of which is on an upright, X, attached to the finger-bar C. This lever extends upward behind the arm U, and each time the grain-platform is drawn forward to the finger-bar to receive the cut grain the crank-arm L comes in contact with the lower end of the lever W, and causes its upper end to throw upward the toothed bar T and cause the grain which it received during the backward or discharge movement of the grain-platform to fall upon the grain-platform. As the grain-platform is moved backward to discharge its load the toothed bar falls to receive the cut grain and hold it until the grain-platform again moves forward. The teeth $i$ of the bar T are a great improvement, as they, in connection with bar T, afford an ample support for the cut grain during the backward movement of the grain-platform. On the shaft O, on which the crank N works, there is placed a double-grooved pulley, Y, which is driven by a belt from the axle of the wheels B B. The reel is also driven by a belt from this pulley. The pulley Y is placed loosely on the shaft O, the latter being fixed, and the crank N is placed loosely on said shaft, the inner end of the crank being provided with a hub having ratchet-teeth, $j^*$, with which teeth $k^*$ on the outer side of the pulley Y engage, (see figs. 1 and 5.) The inner side of the pulley Y has a wheel, Z, attached to it, and said wheel has a spiral groove, $l$, in its inner side, extending from its centre to its periphery. Z' is a vertical rod which is allowed to slide freely in bearings, $m$, attached to the post P, the lower end of said rod having a pin, $n$, projecting horizontally from it, and extending into groove $l$. A' is also a sliding rod fitted in bearings, $o$, attached to the post P, and having a pin, $p$, projecting horizontally from its lower end, said pin projecting over the periphery of the wheel Z, the lower end of the rod A' extending down by the side of the wheel Z, as shown in fig. 5. The periphery of the wheel Z has a projection, $q$, attached, and within the spiral groove $l$ there is secured a projection, $r$. This projection should be secured in the groove in such a manner that it may be detached and fitted in any part of the same. The pulley Y and wheel Z have a continuous rotary motion, but the crank N has an intermittent one given it, as follows: At each revolution of the pulley Y and wheel Z the projection $r$ comes in contact with the pin $n$ at the lower end of rod Z', and slides the pulley and wheel on the shaft O, so that the teeth $k$ of the pulley will come in contact with the ratchet-teeth $j$ of the crank, and cause the latter to rotate, the pulley being retained in gear with the crank by means of the lower end of the rod A', which slips down by the side of the wheel Z. The pulley thus connected with the crank, makes one revolution, and the projection $q$ then raises the rod A', and a fork, B', actuated by a spring, $s$, throws the pulley Y out of gear with the crank, which remains stationary until the projection $r$ in the groove $l$ again comes in contact with the pin $n$ of the rod Z', when the pulley is connected with the crank as before. Thus an intermittent motion is communicated to the grain-platform, and the movement of the latter may be made at greater or less intervals, according to the size of the gavels required to be discharged, or to suit the condition of the crop, according as the same is light or heavy, by changing the position of the projection $r$ in the spiral groove $l$.

Having thus described my invention, I claim as new, and desire to secure by Letters Patent—

1. The fingers $h$, pivoted to the bar $b$, operating in combination with the clearer S, substantially as and for the purpose specified.

2. The shaft K provided with fingers $d$, and arranged to operate in connection with the grain-platform, substantially as and for the purpose specified.

3. The grain-supporting bar T, provided with the oblique teeth $i$, and raised and lowered automatically from the grain-platform, substantially as and for the purpose set forth.

4. I claim, in combination with a harvesting machine, an automatic gavel regulator, so constructed that it can be set so as to make the gavels at such different regular distances apart as desired, substantially as set forth.

The above specification of my invention signed by me this 23d day of April, 1866.

ADAM R. REESE.

Witnesses:
WM. F. McNAMARA.
ALEX. F. ROBERTS.